United States Patent [19]

Roumens

[11] 4,226,832
[45] Oct. 7, 1980

[54] DEVICES FOR FERMENTATION OF ORGANIC REFUSE AND SLURRIES

[76] Inventor: Didier Roumens, 3 Bd.St-Germain, Paris, France, 75005

[21] Appl. No.: 831,653

[22] Filed: Sep. 8, 1977

[30] Foreign Application Priority Data

Sep. 17, 1976 [FR] France ................................ 76 27970

[51] Int. Cl.³ ........................... B01J 19/18; B01J 4/00; C05F 3/06
[52] U.S. Cl. .......................................... 422/184; 71/9; 422/232
[58] Field of Search ................. 23/259.1; 71/9; 34/52, 34/170; 126/181; 422/232, 238, 239, 184

[56] References Cited

U.S. PATENT DOCUMENTS

| 1,924,860 | 8/1933 | John et al. ............................ 126/181 |
| 2,148,946 | 2/1939 | Hubmann et al. .............. 23/259.1 X |
| 2,633,413 | 3/1953 | Eweson ................................ 23/259.1 |
| 2,660,809 | 12/1953 | Morrison ........................ 23/259.1 X |
| 3,314,765 | 4/1967 | Abson et al. ........................ 23/259.1 |
| 3,710,449 | 1/1973 | Rathbun ............................ 34/170 X |
| 3,756,784 | 9/1973 | Pittwood ................................ 71/9 X |
| 3,986,270 | 10/1976 | Kyle, Jr. ................................ 34/52 |
| 4,135,908 | 1/1979 | Widmer ................................... 71/9 |

FOREIGN PATENT DOCUMENTS 2331622  1/1975  Fed. Rep. of Germany ................ 71/9

Primary Examiner—Joseph Scovronek
Assistant Examiner—Roger F. Phillips
Attorney, Agent, or Firm—Darby & Darby

[57] ABSTRACT

Silo apparatus for fermenting organic material into compost in which the organic material is gravity fed into a vertical compartment and taken out through an extractor compartment. Gas is fed upwardly through the material and a separator means is provided having variable size openings to control the passage of the material from the upper compartment to the extractor compartment.

13 Claims, 9 Drawing Figures

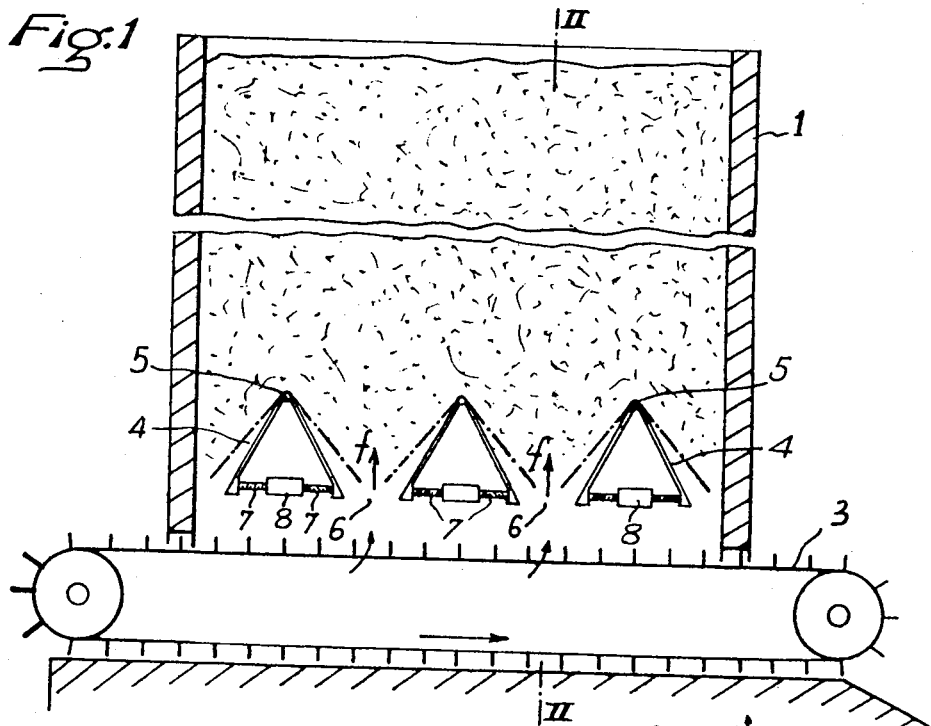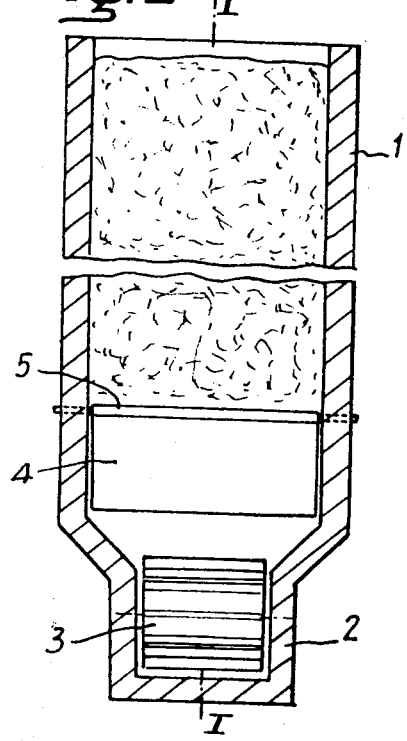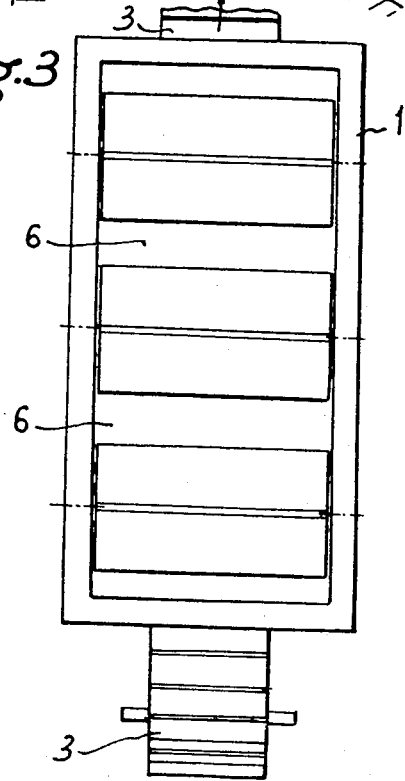

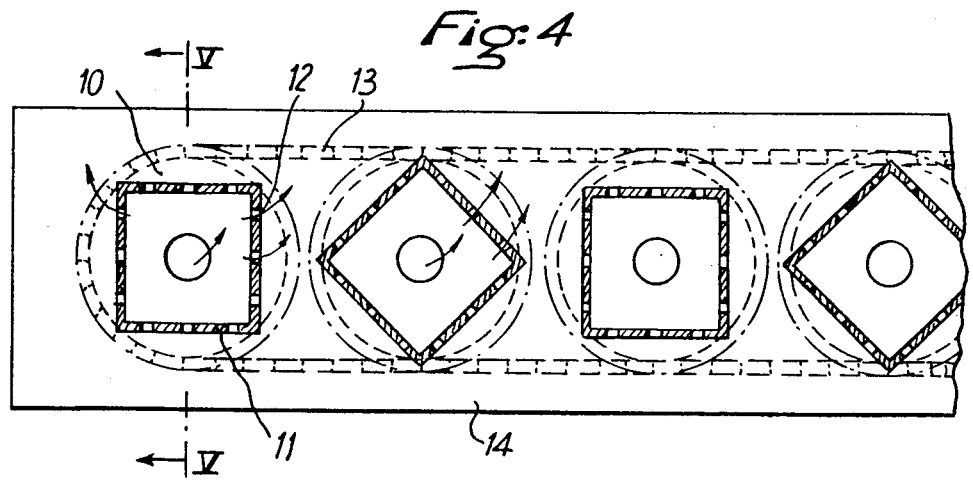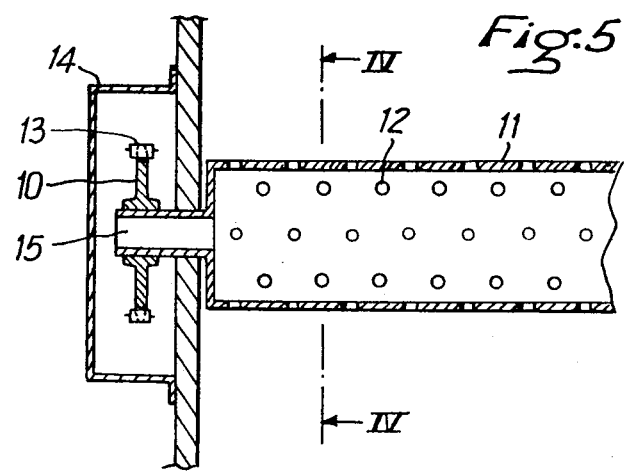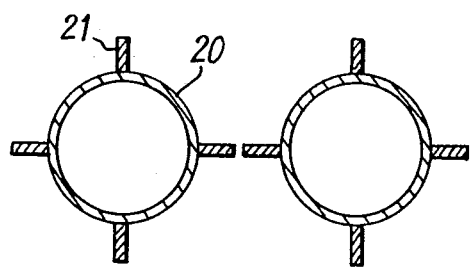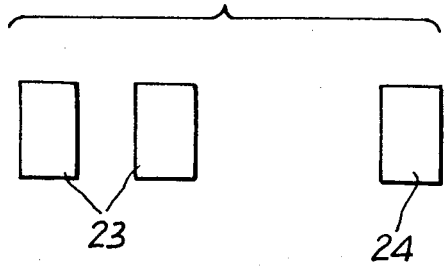

DEVICES FOR FERMENTATION OF ORGANIC REFUSE AND SLURRIES

The present invention relates to the construction of fermentation silos or towers designed to treat slurries, sludges, liquid manure, and organic refuse, and in particular, slurries from water purification installations, combined or not with household garbage, or light products such as ground straw, manure or the like, these slurries or miscellaneous mixtures being first brought to the hygrometry suitable for this kind of fermentation.

It is known in using installations, for fermentations of this kind, which contain a vertical compartment in which the materials to be processed are introduced from the top and descend by gravity, that air needed for aerobic fermentation is introduced into the mass through the bottom, and the compost formed is evacuated by devices located at the base of the installation.

In installations of this kind there are two problems which have to be solved simultaneously. On the one hand, the descent of the materials toward the evacuation device must be suitably regulated, and on the other, a good distribution of the air, and its regulation, at the base of the fermentation compartment must be insured.

The object of the present invention is an installation for fermentation of products of this kind which allows such regulation under satisfactory conditions.

According to the present invention a separation device with adjustable, variable openings is provided between the fermentation compartment and the evacuation compartment for the controlled passage of the fermented material into the evacuation compartment. The separation device can be formed by a plurality of orientable pieces having orifices for insufflation of air into the base of the fermentation zone.

According to a preferred embodiment, the separation device with variable openings is formed by the juxtaposition of groups of angularly mounted shutters assembled in pairs around a horizontal axis of rotation, in such a way that their angles are variable, the passage offered to the material between these groups of shutters thus being adjustable. In this case, the air to be insufflated is introduced into the evacuation compartment, and penetrates into the upper compartment through the passages formed between the groups of shutters.

According to another embodiment, the separation device with variable openings is formed by parallel, horizontal, tubular elements mounted rotatably on their axis, these tubular elements being supplied in their interiors by the air to be insufflated for the fermentation, and having orifices for passage for this air. The tubular elements can be fed with air through a supply tank, the adjustment in position by rotation around their axis being insured by individual grooved wheels and a common chain. The horizontal tubular elements can be of a flattened rectangular section, capable of rotating on their axis, their wide upper face being pierced with holes for passage of the air to be insufflated, which are connected together by linking elements, the adjustment in position of the assembly being operated by a jack.

By way of example, and to facilitate comprehension of the description, there is represented in the attached drawings:

FIG. 1 is a schematic elevational view of a preferred embodiment of the invention partly in cross-section;

FIG. 2, in vertical section along line II—II in FIG. 1;

FIG. 3 is a top view of the embodiment of FIG. 1;

FIG. 4 is a schematic view of a further embodiment of the separation device;

FIG. 5 is a sectional view along line V—V of FIG. 4;

FIG. 8 is an end view of a further embodiment of separation device; and

FIG. 9 is a schematic diagram of a fermentation installation.

Figure 6:
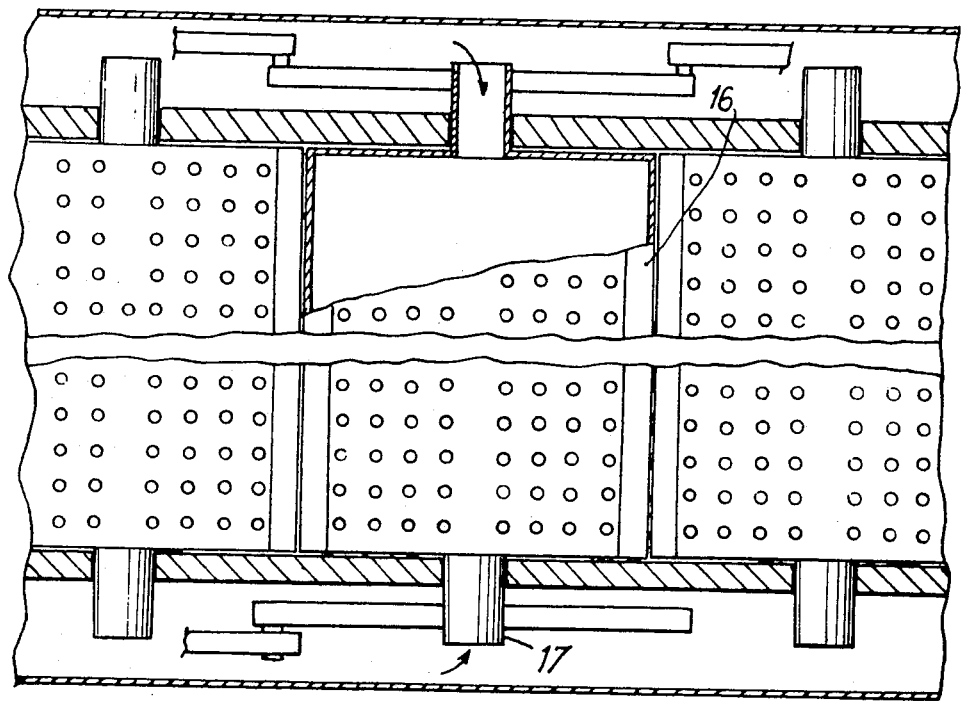
FIG. 6 is a schematic view of another embodiment of the separation device in section along line VI—VI of FIG. 7.

Referring to FIGS. 1 to 3, it is seen in this embodiment that the installation includes an upper compartment or silo 1 which is preferably rectangular in horizontal section, and a lower compartment 2, in which there is an evacuation or extraction device of any appropriate kind, and which in this example is a conveyor 3 with scraper blades. In such an installation, the materials which have previously been brought to a convenient or desired degree of humidity, are introduced and distributed in the silo from the top, by means of any appropriate device, not shown, and they descend gradually in the course of the fermentation and of the extraction, which is operated at the base, of the compost obtained.

Between compartments 1 and 2 there is a separation device, constructed in such a way as to control the descent of the materials, and insure, under conditions of good distribution, the penetration of the air needed for aerobic fermentation in the mass of materials processed. This separation device can assume diverse forms, three examples of which are given to explain its functions and to specify certain forms of embodiments which are particularly advantageous.

In the example of the preferred embodiment represented in FIGS. 1 to 3, the separation device is formed by groups of angularly mounted shutters 4, mounted in pairs on respective axes 5 around which they can rotate. They thus appear as juxtaposed, prismatic assemblies, the angle, alpha, at the apex of which can be changed by a suitable control. Between two of these prismatic assemblies there is, thus, a passage 6 serving for the descent of the materials which can be adjusted by action on the control mechanism varying the angle alpha.

This mechanism controlling the size of passage 6 can be formed as follows. In the angle formed by two shutters 4 one or more mechanical jacks 8 are provided, cooperating with screws 7 whose ends press on the ends of the shutters. Hydraulic jacks instead of mechanical jacks 8 can be used. The jacks can be operated individually or under a common control.

The separation device described above can serve at the same time for the introduction of the fermentation air at the base of the column of processed materials. The simplest solution, envisaged here, is by feeding the air at slight pressure into compartment 2. This air is distributed under the entire lower surface of separation, and penetrates into the materials through the passages 6 along arrows f. A variant can be in the provision, in shutters 4, of holes or slits sufficient for the passage of the air, but insufficient for the passage of the materials. Furthermore, the two arrangements can be combined.

A second embodiment represented in FIGS. 4 and 5, comprises forming the separation device by the juxtaposition of hollow bodies 11, leaving passage for the material between them varying in width according to their orientation. These hollow bars can be polygonal in shape in section, for example, triangular, square, as represented, or rectangular, and are provided with holes 12 for the insufflation of air into the processed materials. The bars, on at least one of their ends, have drive wheels 10, and a common drive chain 13, making it possible to rotate them all together with a single movement. There can also be provided, on the contrary, the drive of only every other bar. The air under pressure, intended for the fermentation, is supplied to these bodies by a common manifold 14 communicating with the end of each of them through a duct 15 which can be the axis of rotation of a respective bar.

This device can be used in two ways. In continuous operation it can be used with intermittent stops, the rotation of the bars improving the regularity of the passage of the materials between them. The drive chain 13 is driven by any appropriate motor system. These also can be a simple variable orientation of the bars 11, changing the passage space left between them, in a manner analogous to that which is provided in the first form of embodiment described above in FIGS. 1-3.

These bars, instead of being polygonal in section, can be formed as a round tube 20 equipped with added-on, extending vanes 21, producing a substantially equivalent effect (See FIG. 8).

Figure 7:
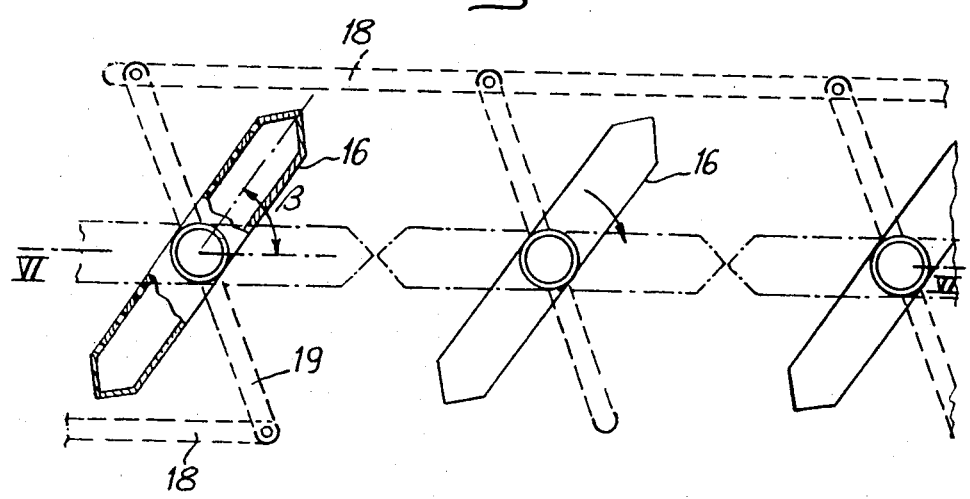
FIG. 7 is a corresponding elevational view shown broken away and partly in section of the embodiment of FIG. 6.

In the form of embodiment shown in FIGS. 6 and 7, the bars have the form, in section, of flat rectangles 16, with variable inclination. Each bar is mounted in the silo on a respective axial shaft 17, at least one of which is hollow and serves for the introduction of air under pressure. They are connected together by linking rods 18 and connecting rods 18, so that they are always parallel, leaving passages between them. The inclination, β, of these plates, and consequently the size of passage can be changed by action on linking rods 19, for example by means of jacks, not shown. This form of embodiment makes it possible to obtain a continuous separation for the passage or by reducing angle β to 0, the plates will then constitute a sort of horizontal partition. These plates have, on their upper face, holes 20 through which the air introduced through shafts 17, spreads into the fermenting mass.

A fermentation installation as described above can be provided either to insure the fermentation process from beginning to end, or to form part of a set of silos disposed in series, in each of which a part of the fermentation takes place, the material being processed successively in each of them. Thus we can dispose in series, as represented in FIG. 9, one or two fermentation silos with relatively low aeration 23, followed by a final silo 24 designed to adjust the degree of dryness of the compost to the desired level. The final silo can in particular contain, for this purpose, a strong aeration and perhaps an insufflation of hot vapors or gases, such as combustion gases from the incineration of refuse.

I claim:

1. A silo for producing compost from organic material subjected to aerobic fermentation comprising
    a container having closed sides, an opening in the top through which the organic material is introduced and gas produced by the fermentation process escapes, and an opening in the bottom through which the compost exits, means for supplying gas into the lower portion of the container to traverse upwardly in the container through substantially all of the material being fermented to aid in the fermentation, the interior of the container from the top to a lower portion thereof which is adjacent the bottom being unobstructed so that the organic material will fall of its own weight from the container top to said lower portion as the fermentation process takes place, the gas supplied into the container and gases produced during fermentation moving upwardly through the material being fermented from said lower portion to the opening at the top and exit therefrom while said material is simultaneously moving downward in the opposite direction, and
    means at said lower portion of said container for controlling both the rate at which the material moves downwardly in and exits from the container and the volume of the gas supplied to the material in the container, said controlling means comprising a plurality of elements, means for mounting said elements rotatably about generally parallel horizontal axes, the amount of rotation of said elements determining the spacing therebetween and the rate at which the moves downwardly in and exits from the container.

2. A silo as in claim 1 wherein said means for supplying gas to the container comprises orifices in said elements.

3. A silo as in claim 1 wherein said elements comprise a plurality of pairs of shutters, means for mounting each shutter of a pair obliquely on an axis of rotation so that their obliquity will be variable, thereby determining the size of the openings between the shutters of adjacent pairs to control the rate of material as it moves from the top to the bottom of the container to exit therefrom and also the amount of gas supplied to the container.

4. A silo according to claim 1 wherein said elements comprise parallel, rotatably mounted tubular elements, the orientation of said elements determining the size of the openings for the passage of the material.

5. A silo according to claim 4 wherein said tubular elements are hollow and have openings, and means for supplying gas to the interior of said elements for passage through said openings to the material.

6. A silo according to claim 11 wherein said openings of said tubular elements also diffuse the gas in the space between the tubular elements.

7. A silo as in claim 5 further comprising means for rotating said elements in common.

8. A silo as in claim 7 wherein said rotating means comprises a wheel on each element and a common drive chain.

9. A silo as in claim 5 wherein said tubular elements have extending fins.

10. A silo as in claim 5 wherein said tubular elements are polygonal in shape.

11. A silo as in claim 5 wherein said tubular elements are flattened rectangles.

12. A silo as in claim 7 wherein said rotating means comprises common link means, and a respective connecting link means connected between said common link means and each said element.

13. A silo as in claim 3 further comprising means for moving said shutters of a pair, said moving means comprising a jack between the two shutters of a pair.

* * * * *